United States Patent
Duggan et al.

(10) Patent No.: US 11,099,733 B2
(45) Date of Patent: Aug. 24, 2021

(54) DYNAMIC COMMAND PRESENTATION AND KEY CONFIGURATION FOR KEYBOARDS

(75) Inventors: Finbarr Duggan, Bray (IE); Seung Yang, Woodinville, WA (US); Gerrit Hofmeester, Woodinville, WA (US); Vasudha Chandrasekaran, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1183 days.

(21) Appl. No.: 13/249,258

(22) Filed: Sep. 30, 2011

(65) Prior Publication Data

US 2013/0082935 A1   Apr. 4, 2013

(51) Int. Cl.
*G06F 3/0488* (2013.01)
*G06F 3/044* (2006.01)
*G06F 3/041* (2006.01)
*G06F 3/02* (2006.01)

(52) U.S. Cl.
CPC ......... *G06F 3/04886* (2013.01); *G06F 3/041* (2013.01); *G06F 3/044* (2013.01)

(58) Field of Classification Search
CPC ....... G06F 3/041; G06F 3/04886; G06F 3/044
USPC ................... 345/168–178; 715/773
See application file for complete search history.

(56) References Cited

U.S. PATENT DOCUMENTS

| | | | |
|---|---|---|---|
| 5,748,177 A | * | 5/1998 | Baker et al. ................ 345/172 |
| 5,818,361 A | * | 10/1998 | Acevedo ........................ 341/23 |
| 5,963,671 A | | 10/1999 | Comerford et al. |
| 6,600,480 B2 | * | 7/2003 | Natoli ........................... 345/168 |
| 6,650,318 B1 | * | 11/2003 | Arnon ........................... 345/168 |
| 6,724,370 B2 | | 4/2004 | Dutta et al. |
| 7,311,455 B2 | | 12/2007 | Matias |
| 8,347,221 B2 | | 1/2013 | Griffin et al. |
| 8,812,972 B2 | | 8/2014 | Bangalore |
| 8,812,973 B1 | | 8/2014 | Cohen et al. |
| 2003/0174125 A1 | * | 9/2003 | Torunoglu ............ G06K 9/224 345/168 |
| 2006/0132447 A1 | * | 6/2006 | Conrad ................ G06F 3/0219 345/168 |
| 2006/0253793 A1 | * | 11/2006 | Zhai .................... G06F 3/04883 715/773 |
| 2007/0080954 A1 | * | 4/2007 | Griffin et al. ................. 345/173 |

(Continued)

OTHER PUBLICATIONS

"TouchScreen Keyboards for Windows and Macintosh Systems", Retrieved at <<http://www.orin.com/touchscreen/>>, Retrieved Date: Jun. 8, 2011, pp. 9.

(Continued)

*Primary Examiner* — Kwin Xie
(74) *Attorney, Agent, or Firm* — Newport IP, LLC; Jacob P. Rohwer

(57) ABSTRACT

Techniques involving selective modification of keyboard presentation and functionality. A commanding mode is selectively activated on a virtual keyboard. Activating the commanding mode attributes commands to respective individual keys of the virtual keyboard. Also in response to the commanding mode, indicia suggestive of the command is presented on those individual keys to which the commands were attributed. The commands can be executed in an application in response to selection of the respective individual keys when in commanding mode.

16 Claims, 7 Drawing Sheets

(56) References Cited

U.S. PATENT DOCUMENTS

| | | | |
|---|---|---|---|
| 2009/0228792 A1* | 9/2009 | van Os | G06F 3/04842 |
| | | | 715/702 |
| 2009/0228842 A1* | 9/2009 | Westerman | G06F 40/166 |
| | | | 715/863 |
| 2010/0060585 A1* | 3/2010 | Chiu | 345/168 |
| 2010/0115159 A1* | 5/2010 | Cookson | 710/67 |
| 2010/0115448 A1 | 5/2010 | Lysytskyy et al. | |
| 2010/0231515 A1 | 9/2010 | Ng | |
| 2010/0235726 A1* | 9/2010 | Ording | G06F 1/1626 |
| | | | 715/234 |
| 2011/0141027 A1* | 6/2011 | Ghassabian | 345/168 |
| 2012/0013541 A1* | 1/2012 | Boka et al. | 345/173 |
| 2012/0235912 A1 | 9/2012 | Laubach | |
| 2013/0097548 A1* | 4/2013 | Yang et al. | 715/773 |

OTHER PUBLICATIONS

"Comfort Keys Pro", Retrieved at <<http://www.comfort-software.com/download/CKeysManual.pdf>>, Retrieved Date: Jun. 8, 2011, pp. 37.

"Comfort On-Screen Keyboard Lite 5.0", Retrieved at <<http://comfort-on-screen-keyboard-lite.smartcode.com/info.html>>, May 21, 2011, pp. 2.

* cited by examiner

DYNAMIC COMMAND PRESENTATION AND KEY CONFIGURATION FOR KEYBOARDS

BACKGROUND

Physical keyboards and on-screen keyboard emulators may enable keyboard commanding, which allows commands to be performed in an application by pressing a combination of keys or representations of such keys. For example, holding a modifier key (e.g. Ctrl) while concurrently pressing a character or "shortcut" key can cause a command to be performed. Such commands may be able to be accessed in other ways, such as via a graphical user interface (GUI) menu, icon or other manner, where keyboard commanding enables commands to be reached by pressing key combinations.

Keyboard commanding may improve on GUI commanding via mouse or on-screen commanding as no special keys for commands are needed, as existing physical or on-screen keys can be utilized without needing additional working space. Further, users do not need to remove their hands from the keyboard, which may improve input efficiency.

Notwithstanding some benefits to keyboard commanding, keyboard commanding systems suffer from a discoverability issue, where keyboard shortcuts for commands are difficult for users to discover and learn. In on-screen environments, this may result in the use of dedicated on-screen elements despite the availability of keyboard-based commanding. Additionally, modifier keys can serve various purposes in physical keyboards that would be inappropriate or difficult in a keyboard optimized for touch, and leveraging an input system designed for physical keyboards may therefore be ineffective.

SUMMARY

Techniques involving selective modification of keyboard presentation and functionality. One representative computer-implemented technique includes activating a commanding mode on a virtual keyboard. Activating the commanding mode attributes commands to respective individual keys of the virtual keyboard. Also in response to the commanding mode, indicia suggestive of the command is presented on those individual keys to which the commands were attributed. The representative technique further involves enabling execution of the commands in a processor-implemented application in response to selection of their respective individual keys when in commanding mode.

Another representative implementation involves an apparatus that includes at least a touch-based keyboard and a processor. The touch-based keyboard includes visually presented keys. At least one of the keys is configured as a modifier key, and at least one of the other keys is configured as a standard key to provide a first function when selected. The processor is configured to recognize that the modifier key has been selected, which initiates a commanding mode. In response to the commanding mode, the processor is configured to present command indicia on the standard key, and to reconfigure the standard key to provide, when selected, a different function identifiable by the command indicia.

In yet another representative embodiment, computer-readable media having instructions stored thereon which are executable by a computing system. The executable instructions can present a touch keyboard, and provide a selectable modifier key on the touch keyboard that is configured to enable and disable a commanding mode. When executed the instructions can recognize that the commanding mode has been enabled by selection of the modifier key, and in response, can dynamically present command identifiers on respective keys of the touch keyboard. The instructions can recognize that a key that has a command identifier presented on it has been selected, and in response, provide a series of keystroke actions to a keyboard stack to carry out a command identifiable by the command identifier of the selected key. The instructions may further disable the commanding mode to return the touch keyboard to its state prior to enabling of the commanding mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
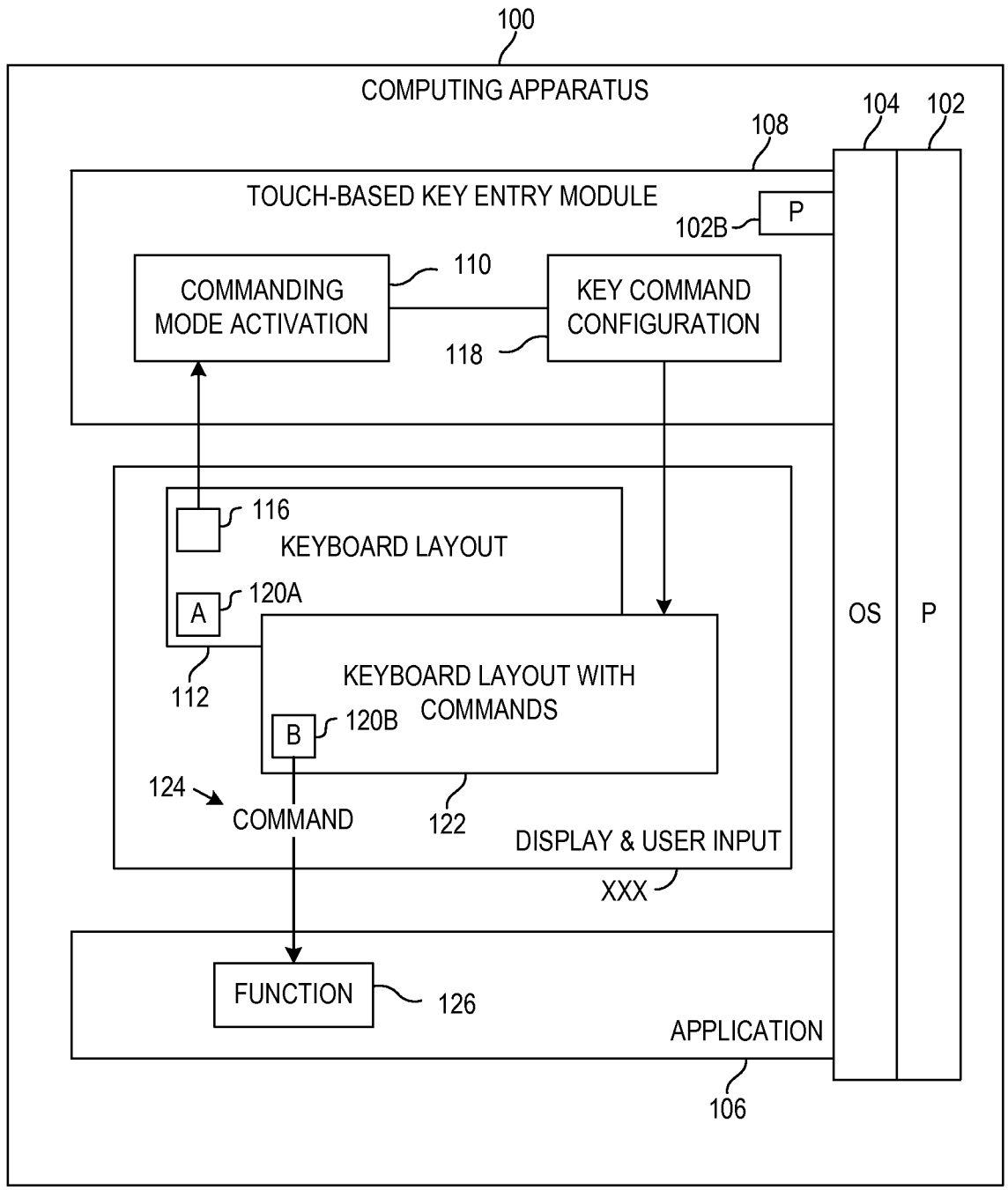
FIG. 1 is a block diagram depicting a representative computing apparatus that incorporates virtual keyboard-based commanding in accordance with the disclosure.

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to keyboard functionality. Often a physical keyboard is associated with a computing system, such as a physical keyboard that connects to a computer wirelessly or by way of cabling. Other user entry mechanisms involve virtual keyboards that provide visual presentations of keyboards, such as presented on a display device, projected on a table or other surface (e.g. projection keyboard), via surface computing, etc. The present disclosure may be utilized in connection with any collection of selectable indicia generally referred to herein as keyboards, that facilitate modifiable visual representations on at least one of the selectable indicia (e.g. keys).

Computer-executed applications typically receive keyboard input such as characters and other input identified by the key itself. However, applications often facilitate entry of commands or functions that are not specifically associated with a designated key. For example, a function at an operating system level or application level may be invoked by pressing a series of keystrokes that serve as a "shortcut" for performing that function. An example is CTRL+C, which can copy selected information to an electronic clipboard although the keyboard may not have a designated "copy" key. However, because such shortcuts involve a series of keystrokes that may not be identified on the keyboard, such keyboard commanding suffers from a discoverability issue. The keyboard shortcuts for commands are difficult for users to discover and learn. Onscreen and other visually-presented keyboards could present additional dedicated keys for additional commands, but this could result in an unacceptably large visual layout that may not significantly alleviate discoverability difficulties.

Another representative problem involves the use of virtual keyboards in input systems designed for physical keyboards. Applications may leverage an input system designed for physical keyboards in their application of keyboard-based commanding. Character entry solutions optimized for touchscreens cannot share the same input architecture as traditional keyboards without compromising their design, since modifier keys can serve many purposes in physical keyboards which would be inappropriate in a keyboard optimized for touch. As a result, soft keyboards and other virtual keyboards do not provide commanding or require applications to expose commanding in a new way.

The disclosure addresses these and other problems. Discoverability problems are addressed by, for example, displaying descriptions, images, colors and/or other indicia of the commands on the relevant shortcut keys when commanding mode is engaged. As a result, no on-screen elements would need to be displayed within the application. Issues involving input systems designed for physical keyboards may be addressed by utilizing the existing commanding system. To avoid the modifier issues described above with virtual keyboards, a virtual modifier key may be provided that operates within the scope of the virtual keyboard, and engages a commanding mode rather than sending a modifier key touch/press event. Each shortcut key press on the touch keyboard or other virtual keyboard can wrap multiple key actions on the traditional keyboard stack to achieve an analogous effect as if using a modifier based solution on a physical keyboard. Accordingly, users can get physical keyboard commanding that appears to behave as that of a physical keyboard, and applications can get touch or other virtual keyboard commanding without involving any additional work to be undertaken. Users do not have to change their posture or move his/her hands away from the keyboard to a pointing device, and can more readily copy, paste and do other commands without having to recall a keystroke combination for each command.

Various embodiments below are described in terms of onscreen or touch keyboards. It should be recognized, however, that the description is applicable to any virtual keyboard or other keyboard capable of configurably adapting visual indicia on one or more keys of the collection of keys. References to touch keyboards, touchscreens, onscreen keyboards, touch-based keyboards, virtual keyboards and the like is intended to broadly encompass collections of selectable items (e.g. "keys") that are visually presented and that collectively provide a manner in which user input can be achieved.

Techniques disclosed herein include activating a commanding mode on a virtual keyboard. In one embodiment, activating the commanding mode attributes commands to respective keys of the virtual keyboard. Text, icons, images, colors, photos and/or other indicia may be presented on the keys to which commands were attributed, in response to the activation of the commanding mode. The commands can be executed by pressing or otherwise activating any of these particular keys. Thus, among other things, the techniques described herein involve touch-based keyboards or other virtual keyboards that incorporate a commanding mode where commands may be associated with individual keys. Text or other indicia is displayed on the appropriate key on the keyboard, which can identify the command(s) to be sent. In some cases, a single key activation (e.g. press) on a virtual keyboard when in commanding mode can replicate multiple key presses involved with physical keyboard shortcut commands. Further, applications can provide text descriptions and/or other indicia for non-standard shortcuts that can be integrated into the keyboard, irrespective of the language the text is provided in. Commands can be dynamically synchronized with a particular keyboard layout. These and other representative embodiments are described in greater detail below.

FIG. 1 is a block diagram depicting a representative computing apparatus 100 that incorporates virtual keyboard-based commanding in accordance with the disclosure. The computing apparatus 100 may represent, for example, a desktop computer, laptop computer, mobile communication device, smartphone or other mobile telephone, application-specific computing devices (e.g. hand-held signature devices, scanners, etc.), or any electronic device capable of presenting a virtual keyboard or other touch-based keyboard to accept user input. The computing apparatus 100 may include a processor (P) 102 and operating system (OS) 104, through which applications and other functional modules may be executed.

In the illustrated embodiment, application 106 represents a computer application that may utilize input from the user by way of a keyboard. The touch-based key entry module 108 represents an executable module that may operate in connection with, or integrally with, an operating system 104. The representative touch-based key entry module 108 of FIG. 1 facilitates activation of a commanding mode, visual alteration of a keyboard layout, and the user selection of a command(s) using the altered keyboard layout. More particularly, the touch-based key entry module 108 of FIG. 1 includes a commanding mode activation module 110, which represents a manner of initiating a commanding mode. The commanding mode activation module 110 may be triggered through selection of one or more selectable keys or other items on a first keyboard layout 112. The first keyboard layout 112 may be presented via the display and user input device 114, which represents a touchscreen or other onscreen or projected keyboard. In one example, the commanding mode is activated by pressing a single modifier key 116 on the first keyboard layout 112, although it could be activated by selecting multiple keys or other user input items. In one particular embodiment, commanding mode is activated by touching a control (CTRL) key on the first keyboard layout 112.

In another embodiment, the commanding mode may be activated by way of recognizable triggering events, other than those involving a user's manual selection. For example, the disclosure contemplates various "smart" triggers that can be based on one or more static and/or dynamic conditions that would suggest that one or more command shortcuts may dynamically be presented on certain keys or other UI mechanisms. As an example, the commanding mode activation module 110 may recognize selection of text in a document, and may dynamically provide the second keyboard layout 122 that may include one or more commands that can be used with selected text (e.g., "copy text" command). As another example, using arrow keys could present a second keyboard layout 122 that includes one or more navigational commands. As these examples suggest, while triggering of the modifier mode may be effected via a particular designated key(s), it can also be triggered in response to other user actions that suggest that the commanding mode is to be activated.

Another representative trigger is a gesture(s) made by a user via the UI. For instance, a touch gesture on a touchscreen, touchpad or other touch-based mechanism to scroll some direction in a document may provide a second keyboard layout 122 that includes one or more navigational commands (e.g., "go to beginning of document," "go to end of document," etc.). Another example may be a touch gesture that suggests an attempt to expand or zoom a document view, where such touch gesture presents various document zoom commands. As these examples reveal, any desired techniques for triggering the commanding mode may be implemented, including but not limited to manual selection via a user interface mechanism(s), indirect triggering via touch gestures, automatic triggering through other user input such as text selection, etc. Thus, it should be recognized that descriptions involving any particular triggering technique are equally applicable to other triggering techniques.

When the commanding mode has been activated, one or more keys on the presented keyboard change to serve as shortcut keys for functions other than the default function of those keys. For example, a key command configuration module 118 recognizes that the commanding mode has been activated, and configures one or more keyboard keys to serve as command shortcuts while in commanding mode. In the example of FIG. 1, the key command configuration module 118 causes at least one key 120A to represent a command key 120B provided via a second keyboard layout 122 with commands. For example, the key 120A of the first keyboard layout 112 may be a character key, such as a "C" key. When the modifier key 116 is selected, the commanding mode activation module 110 recognizes that this modifier key 116 has been selected, and the key command configuration module 118 presents a second keyboard layout 122 with the new command(s) displayed. In the present example, the second keyboard layout 122 may be the same as the first keyboard layout 112, with the exception of added or changed information on the key 120B relative to the original key 120A. As an example, the "C" on the key 120A from the first keyboard layout 112 may be changed to instead or additionally display a command, such as "copy" which is a command to copy a selected portion of a document. When the key 120B is selected by a user, the underlying command 124 is provided to the application 106 (or OS 104, or other target) to perform an associated function 126 for the application 106. For example, if the command 124 represents a "copy" command, text or other data selected in the application 106 will be copied, such as copied to a clipboard.

In one embodiment, the commanding mode activation module 110 causes the commanding mode to remain in effect, and consequently the second keyboard layout 122 to be presented, until the modifier key(s) 116 is no longer being touched/selected. In another embodiment, the modifier key(s) 116 may be configured as a "sticky key," where it toggles on and off upon each successive touch. By activating the commanding mode in this manner, a user can be presented with an altered keyboard view that shows available commands for selection. Rather than having to remember shortcut combinations, the user can press the modifier key(s) 116 to cause the key command configuration module 118 to temporarily configure one or more keys as command shortcut keys, from which the user can make a command selection.

As noted above, one embodiment involves maintaining the commanding mode if the user continues to touch the modifier key 116, and is applied to all subsequent shortcut key touches until the modifier key 116 touch is removed. In another embodiment, a sticky key can be used, which will remain in effect until the modifier key is pressed again to deactivate the commanding mode. In yet another embodiment, the modified mode can be invoked by touching the modifier key(s), and without lifting, sliding to the desired command shortcut key to invoke the action at the command shortcut key where the sliding action stops. These examples are merely representative manners in which the modifier key(s) may be used, and do not represent an exhaustive list. As noted above, the commanding mode may so be invoked in manners where a modifier key(s) is not used, but rather the triggering is "smart" in that it recognizes user actions, gestures or other inputs to invoke the commanding mode.

It should be noted that touch-based key entry module 108 and any associated modules may be executed using software operable by a processor, such as the processor 102. However, a touch keyboard or other virtual keyboard may have a dedicated processor(s) associated therewith, such as processor 102B. Unless otherwise noted, references to a processor as used herein refer to a processing module(s) whether a dedicated processor(s) 102B associated with a virtual keyboard, touchscreen controller, system level processor(s) 102, and/or other processor.

Figure 2:
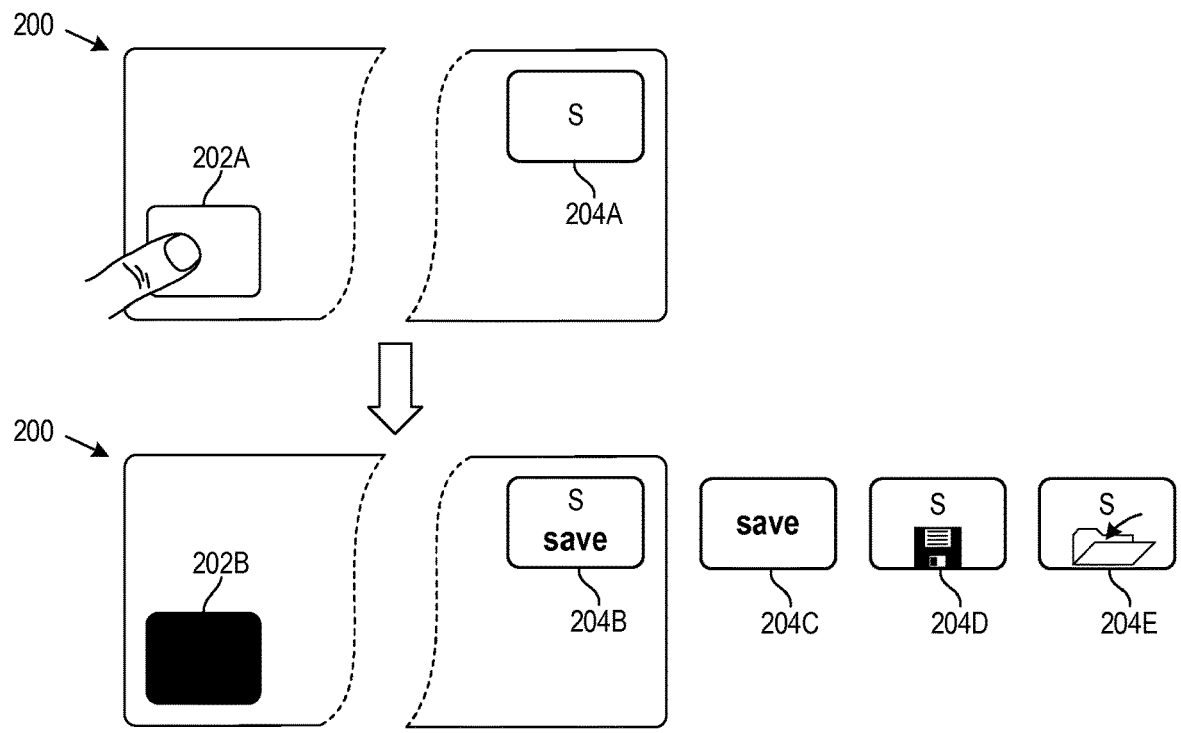
FIG. 2 depicts an example in which a command is associated with and presented on a key in connection with a commanding mode.

FIG. 2 depicts an example in which a command is associated with and presented on a key in connection with a commanding mode. The representative touch-based or virtual keyboard 200 includes a plurality of visually presented keys (referred to generally herein as "keys"), including at least one modifier key 202A and at least one key 204A (referred to in this example as a standard key) that is acted on as a result of the modifier key 202A being activated. In this example, prior to the modifier key 202A being activated by the user, the standard key 204A represents the "S" character key. When the modifier key 202A is touched or otherwise selected, the function associated with the standard key 204A changes in that it will now cause a command to be sent to a keyboard handler module or "keyboard stack" (not shown) rather than the original "S" character. In the illustrated embodiment, the modified standard key 204B becomes associated with a "save" command to save a document, which is also written or otherwise identified for the user on the modified standard key 204B itself. The modifier key 202A may be touched and held, or the modifier key 202A may be configured as a toggle key that remains activated until touched again.

While the text or other indicia (the word "save" in the current example) may be presented next to or otherwise near the modified standard key 204B, in one embodiment the text/indicia is presented somewhere on the face of the modified standard key 204B when in commanding mode. Representative modified standard key 204B depicts that the descriptive indicia may be presented in addition to the original function of the key, which was the character "S" in this example. As the function of the key changes to the command during commanding mode, one embodiment involves replacing the indicia on the key with only the command identifier as shown at key 204C. In yet another embodiment, other indicia such as an image or icon may instead or additionally be presented on the key, as depicted by key 204D. In still other embodiments, indicia such as that shown by any keys 204B, 204C, 204D may be presented by first software such as an operating system. Where the commands are operating system-level commands, the commands associated with keys as a result of entering commanding mode may be available across multiple applications that run on the operating system.

Other indicia such as that shown by key 204E may be presented by second software, such as by the application to which the command is being used. For example, the application may register commands that can be used with the application, key associations, and associated descriptive indicia. When commanding mode is activated via the modifier key 202A/202B, the application's commands can be associated with and described on keys, such as key 204E which may use application-specific text, an icon or image, and/or other descriptive indicia to identify the command associated with the key 204E while in commanding mode.

Figure 3:
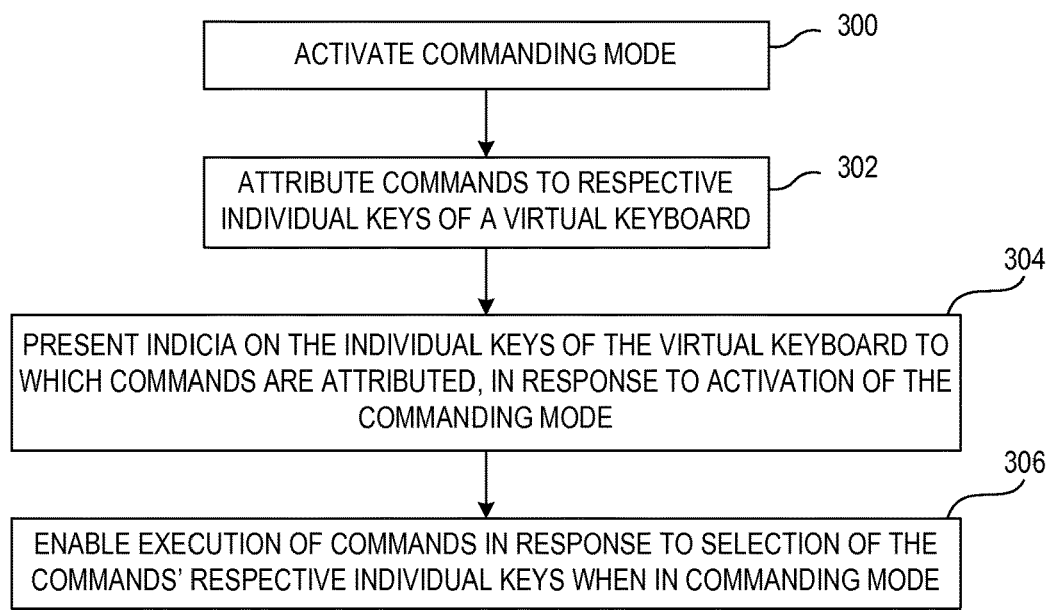
FIG. 3 is a flow diagram of an exemplary manner for identifying command shortcuts on a virtual keyboard.

FIG. 3 is a flow diagram of an exemplary manner for identifying command shortcuts on a virtual keyboard. In this example, a commanding mode is activated as shown at block 300. This may be accomplished in various manners, such as by touching or otherwise selecting one or more keys of the virtual keyboard. As shown at block 302, in response to activation of the commanding mode, commands are attributed to respective individual keys of the virtual keyboard. For example, a "save" command may be attributed to the default "S" key, a "copy" command may be attributed to the default "C" key, etc. When in commanding mode, indicia is presented on the individual keys of the virtual keyboard to which the commands have been attributed, as shown at block 304. By presenting the indicia on the keys themselves, a user can easily identify the appropriate key to press in order to effect the desired command. Block 306 indicates that commands may be executed in response to selection of the commands' respective individual keys when in commanding mode.

Figure 4:
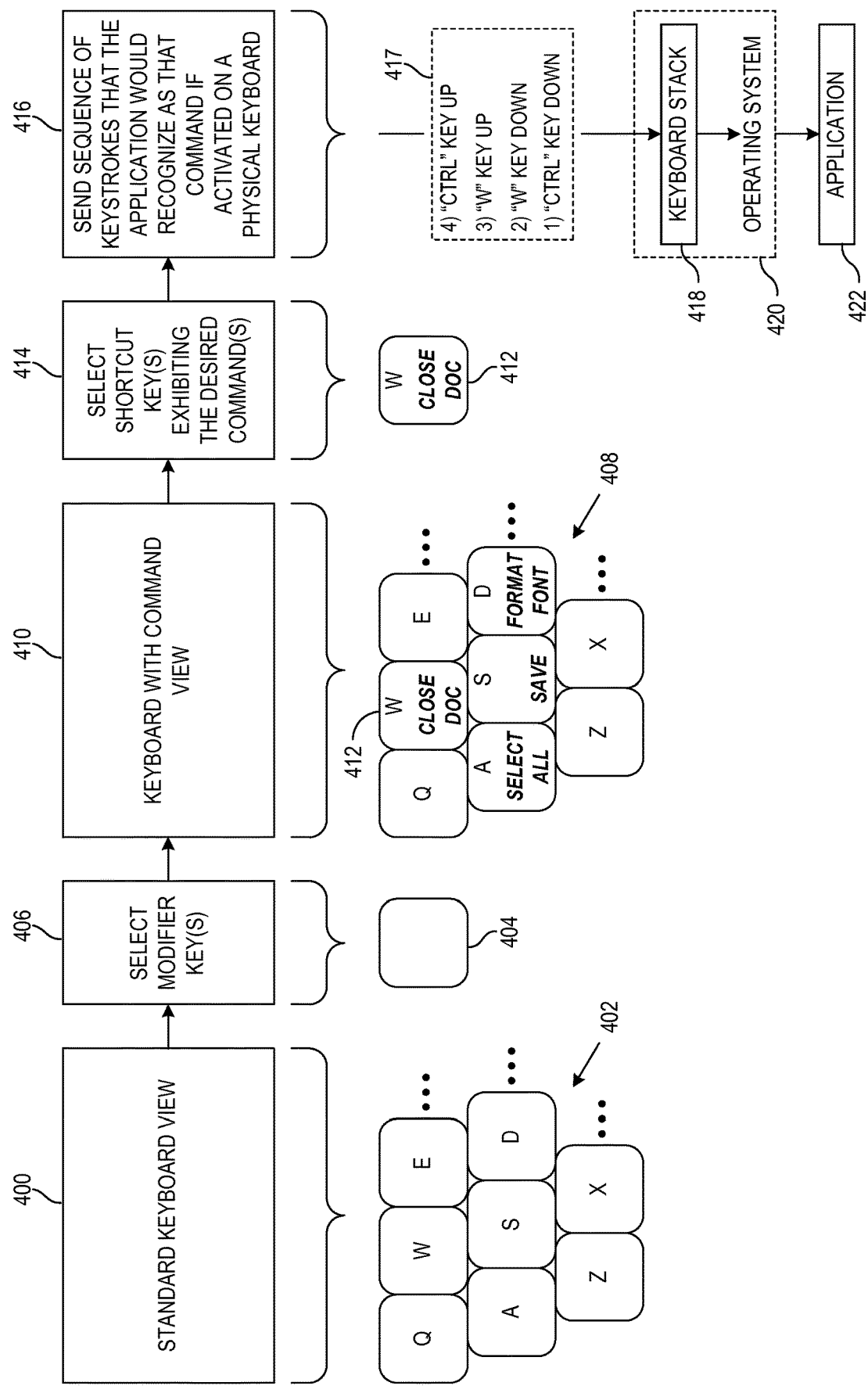
FIG. 4 depicts another example for identifying command shortcuts on a virtual keyboard.

FIG. 4 depicts a more particular example for identifying command shortcuts on a virtual keyboard. A standard keyboard view 400 is first presented, as depicted by the representative keyboard layout 402. Keyboard layout 402 depicts a portion of a standard QWERTY keyboard. In accordance with the disclosure, a modifier key(s) 404 is selected as shown at block 406. The modifier key 404 may be a designated or new key on the keyboard layout 402, although in one embodiment a key already on the keyboard layout 402 is used as the modifier key 404. For example, the control (CTRL) key may be used as the modifier key. In one embodiment, the CTRL or other modifier key 404 does not send any output, but rather it changes the output sent by other keys. In other words, in one embodiment it's effect is to change the payload of the character keys. This is described in greater detail below.

When the modifier key 404 has been touched or otherwise selected, the keyboard layout may change to reflect the commands that are now available in response to activation of the commanding mode. For example, a keyboard layout 408 with command view may be presented as shown at block 410. In the illustrated embodiment, the keyboard layout 408 has changed such that the functions associated with a plurality of the keys has changed to now represent a command rather than a character. For example, the "W" key has changed to depict a description of "close doc" that indicates that the active document in the application will be closed if the key 412 is selected. While the command "close doc" may be an operating system-level command usable across multiple applications, it may also be an application-specific command corresponding to the active application being used with the virtual keyboard.

In the illustrated embodiment, it is assumed that the user has touched key 412, thereby selecting the shortcut key exhibiting the desired command as depicted at block 414. In response, block 416 illustrates an embodiment where that the sequence of keystrokes is provided that the application would recognize as the selected command if activated on a physical keyboard. More particularly, in one embodiment, the sequence of key manipulations is provided to a keyboard stack 418 or other keyboard handling module that is otherwise used for a hardware keyboard, thereby obviating any need to have a keyboard stack dedicated to the virtual keyboard. For example, when the "W—close doc" key 412 is pressed, a series of keystrokes shown at block 417 may be delivered to cause the command to be executed at the application 422. This series of keystrokes may be, for example, a down press of the CTRL key which serves as the modifier key in this example, a down press of the "W" key, a release of the "W" key, and a release of the CTRL key. Thus, pressing the shortcut key 412 while in command mode essentially mimics a series of keystrokes that would be performed on a physical keyboard to perform the command, thereby enabling the same keyboard stack 418 to be used. In this manner, the virtual keyboard emulates a physical keyboard, and the keyboard stack 418 sees the input from the virtual keyboard the same as if it had been received from a physical keyboard where the keystrokes are transmitted as they occur. The keyboard stack 418 may be separate software operating in connection with the operating system 420, or alternatively may be implemented as part of the operating system 420.

Figure 5A:
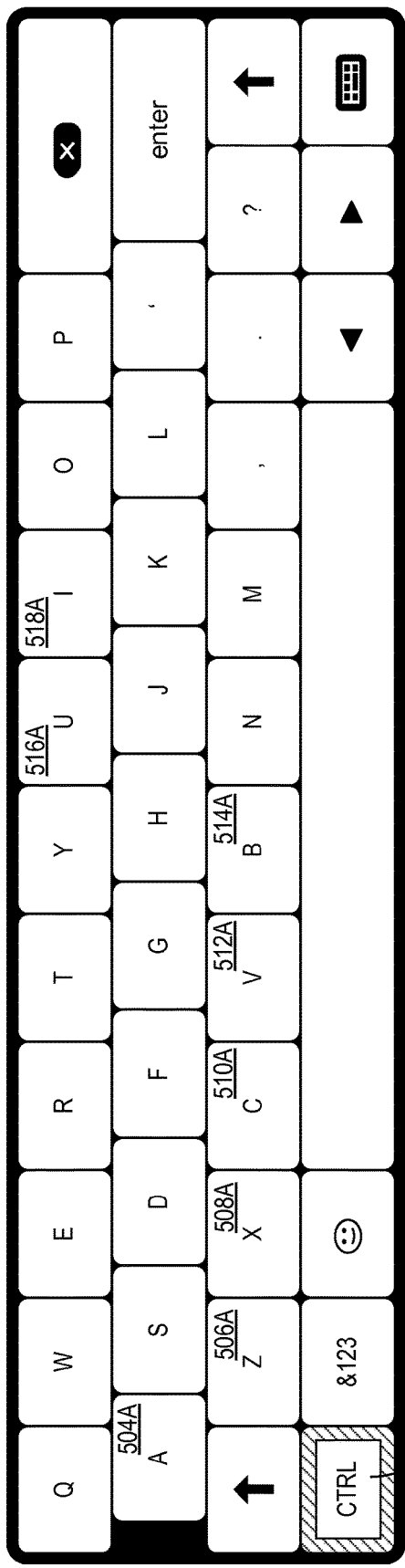
FIGS. 5A and 5B illustrate representative keyboard layouts that depict the dynamic command assignment and command key identification described herein.
Figure 5B:
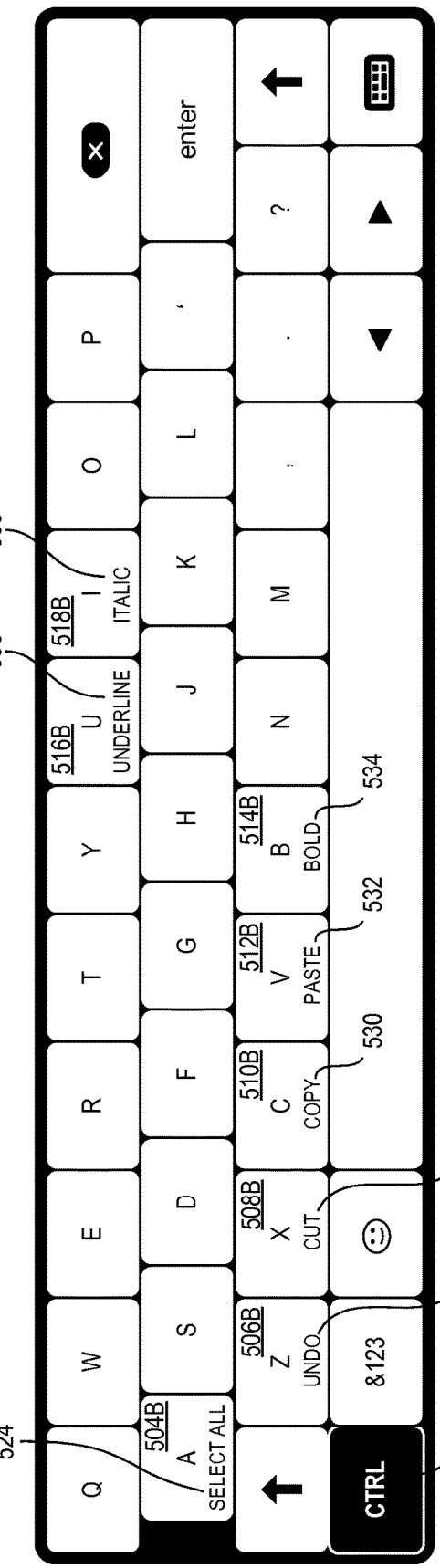

FIGS. 5A and 5B illustrate a representative manner for identifying command shortcuts on a touch keyboard. FIG. 5A illustrates a first state or first layout 500A of a virtual keyboard, which is assumed to be a touch keyboard implemented via a touchscreen in the illustrated embodiment. The CTRL key 502A serves as the modifier key that activates the commanding mode in the illustrated embodiment. The first layout 500A of the touch keyboard represents a QWERTY keyboard that includes character keys, including the character keys identified as keys 504A, 504A, 508A, 510A, 512A, 514A, 516A and 518A.

When the modifier key 502A is touched, the embodiment of FIG. 5B illustrates that it may toggle and remain selected, as depicted by toggled modifier key 502B. While the modifier key is selected as depicted by toggled modifier key 502B, the commanding mode is activated. It should be recognized that some embodiments do not involve a toggle, and the user continues to touch the CTRL key 502B to remain in commanding mode. When commanding mode is activated, commands are presented on one or more of the keys of the keyboard layout 500B. For example, what was originally the character "A" key 504A becomes a shortcut key 504B with the command "select all" to select all text and/or other information in an active application document. The textual description "select all" 524 is also presented on or proximate the key 504B, to assist the user in knowing which key is to be touched in order to cause the "select all" command to be issued to the application.

Similarly, what was originally the character "Z" key 506A becomes a shortcut key 506B with the command "undo" to undo the last action(s) in the active application document, and the text "undo" 526 is also presented. Similar change are shown by shortcut keys 508B-518B and their respective textual descriptions 528-538. As can be seen, activation of the CTRL 502B key or other modifier key(s) activates commanding mode, where available commands 524-538 are presented on shortcut keys 504B-518B. Selection of any of these shortcut keys 504B-518B will cause the respective command to be provided to the application or other targeted software.

Figure 6:
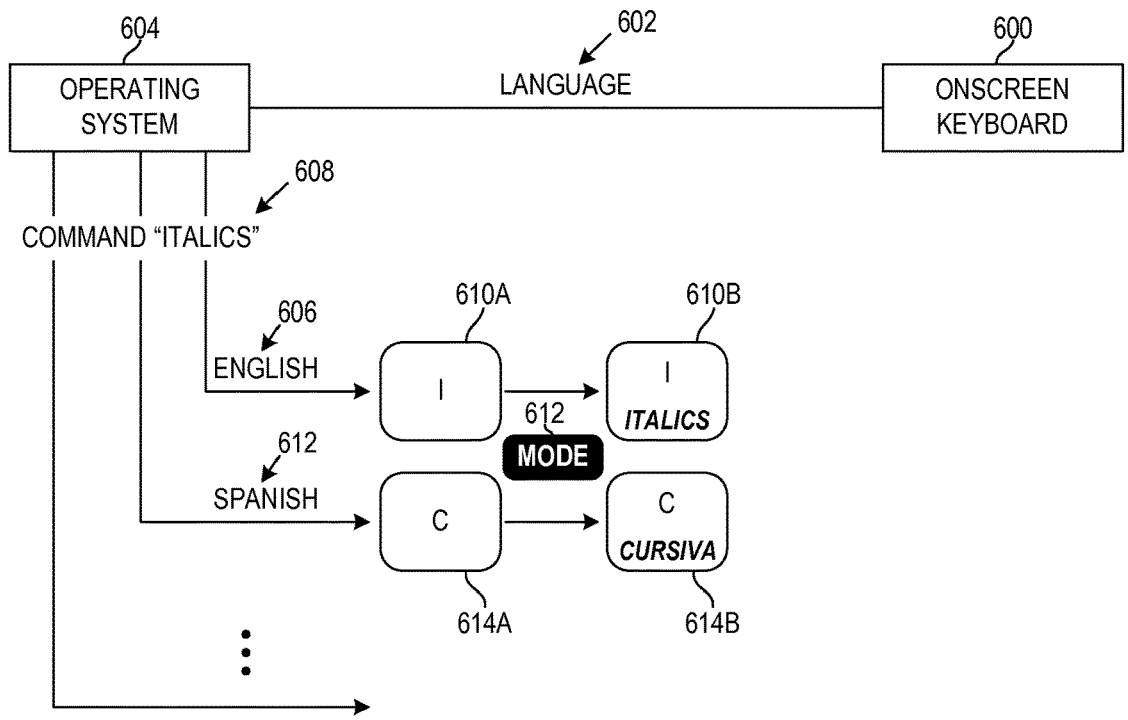
FIG. 6 is a block diagram that illustrates examples of adapting the shortcuts based on keyboard language when in commanding mode.

Embodiments described herein relate to a system where an application can supply text and/or other indicia to describe shortcuts that are not otherwise presented on the keyboard, which will then be integrated into the keyboard irrespective of language. Keyboard layouts may differ depending on the language that is to be used, and selection of a language or region may impact the presentation or layout of the keyboard. In accordance with the disclosure, shortcut identifiers can be presented in the language of the installed keyboard, and may also be presented on different keys for different languages due to the shortcuts potentially being associated with different keys. FIG. 6 is a block diagram that illustrates examples of these features.

A virtual keyboard, such as the onscreen keyboard 600, can be adapted for language by installing the appropriate language 602 via the operating system 604. Depending on the language of the keyboard, the shortcut descriptions and/or other indicia presented on keys when in commanding mode may differ. In the embodiment of FIG. 6, it is first assumed that the installed language 602 is English 606, and commanding mode has been activated. A representative command for "italics" 608 might then adapt a character key "I" 610A. When the mode key 612 has been touched or otherwise selected, the key 610A is modified to that shown by key 610B, where the command "italics" is displayed on the key 610B. In one embodiment the "I" key 610A is selected to ultimately represent the shortcut key 610B, since a CTRL-I in a physical keyboard toggles the italics feature. In this example, the shortcut key 610B description of "italics" is presented in English 606, as this is the language 602 that has been installed for the onscreen keyboard 600.

It is next assumed that the installed language 602 is Spanish 612, and commanding mode has been activated. A representative command for "italics" 608, which may correspond to "cursiva" in Spanish, might then adapt a character key "C" 614A. When the mode key 612 has been touched or otherwise selected, the key 614A is modified to that shown by key 614B, where the command "cursiva" is displayed on the key 614B. In this example, the shortcut key 614B description of "cursiva" is presented in Spanish 612, as this is the language 602 that has been installed for the onscreen keyboard 600.

It should be recognized that the language 602 may be determined based on, for example, the language of the operating system 604 or the language of the keyboard 600. The example above assumes that the language 602 is based on the language installed on the keyboard 600, but the language of the operating system 604 may alternatively be used as the basis for the language selections.

Shortcut key commands may be associated with any keyboard key, and not only character keys. In some embodiments, the modifier key may be used in connection with SHIFT keys, arrow keys, and/or other non-character keys to perform shortcuts. For example, touching the modifier key (e.g. CTRL) and a right arrow key can cause the cursor to jump a word to the right in the application. In one embodiment, a description can be provided on the right arrow key to indicate this command function when the modifier key has been selected. Similarly, the use of the modifier symbol in combination with a plurality of subsequent keys may also perform an appropriate function, such as a combination of CTRL-SHIFT-ARROW where ARROW represents either the left or right arrow to select the word in the direction of the arrow from the position of the cursor. When the last key in the sequence is touched, the whole command sequence can then be provided to the keyboard handling module, also referred to herein as the keyboard stack, for processing and recognition of the desired command.

Other embodiments account for content direction based on language and the ability to provide shortcut keys to change the direction. Most scripts are written from left-to-right (LTR), although certain scripts (e.g. Hebrew, Arabic, etc.) are written from right-to-left (RTL). Where writing incorporates characters from both writing directions, the writing (and reading) order may change multiple times in a single block of text. Thus, shortcut key combinations may be used to change the writing order direction. The disclosure contemplates this by emulating a physical keyboard that can use the commanding mode and one or more subsequent keystrokes to change the writing direction. For example, in a first scenario where no RTL languages are installed, when the CTRL or other modify key is selected, the SHIFT keys can be disabled. On the other hand, when a bi-directional language is installed, the left and right shift keys can be modified to LTR and RTL when in commanding mode. In such case, the left SHIFT key will send CTRL+LEFTSHIFT to switch to LTR writing direction, and the right SHIFT key will send CTRL+RIGHTSHIFT to switch to RTL writing direction. The appropriate direction may be indicated on the shortcut keys in response to the modifier key being selected. This embodiment represents a conditional change, where the key alteration is dependent on which keyboard language is installed. Other conditional key/keyboard changes may also be implemented.

Figure 7A:
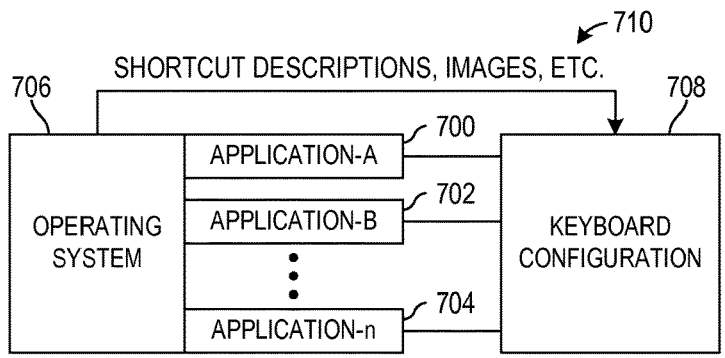
FIGS. 7A and 7B illustrate examples of implementing dynamic shortcut keys using system-level and application-level commands respectively.
Figure 7B:
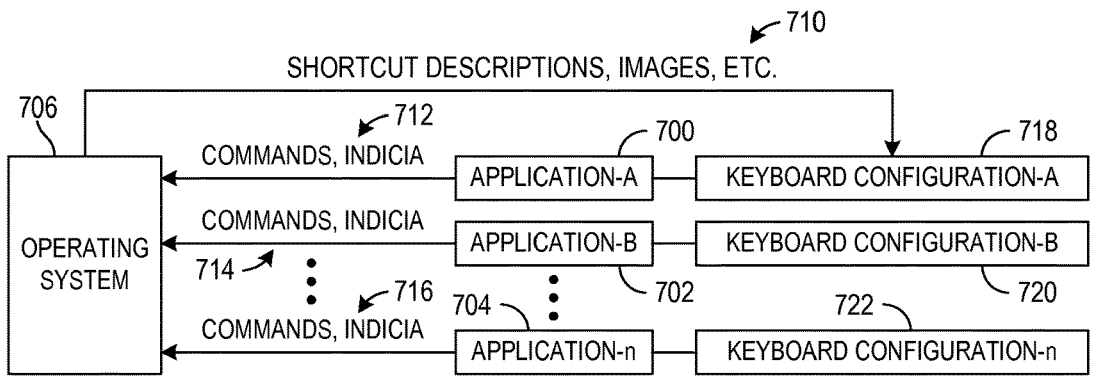

As noted above, the shortcut key commands may be system-level commands, application-level commands, etc. FIGS. 7A and 7B illustrate examples of implementing the dynamic shortcut keys using system-level and application-level commands respectively. Referring to FIG. 7A, multiple applications 700, 702, 704 may execute under the control of an operating system 706. In such an embodiment, the keyboard configuration 708 of shortcut descriptions 710 when in commanding mode can be applied across each of the applications 700, 702, 704. In other words, whether using application-A 700 or application-B 702, pressing the modifier key to activate commanding mode will, in one embodiment, present the same shortcut commands on designated keys of the keyboard.

In another embodiment, the shortcut key commands may be application-level commands, where the applications themselves or other source registers at least some information for specific use with the respective application. FIG. 7B illustrates such an example. Again, the applications 700, 702, 704, and operating system 706 are utilized. In this example, each of the applications 700, 702, 704 registers their commands and/or indicia 712, 714, 716 to be presented for these commands. In another embodiment, the commands themselves are operating system-level commands, but the descriptions and/or other indicia are registered by each application 700, 702, 704. In the illustrated embodiment, it is assumed that each application 700, 702, 704 registers at least its own commands and corresponding shortcut descriptions or other indicia 712, 714, 716 to be presented when in commanding mode. In such case, each application can have an application-specific keyboard configuration 718, 720, 722 to identify shortcut commands when in commanding mode.

For example, application-A 700 may register commands and descriptive indicia 712 with the operating system 706. When the modifier key is selected while using application-A 700, the application-specific commands and indicia 712 registered to application-A 700 may be presented to provide keyboard configuration-A 718. Similarly, application-B 702 may register commands and indicia 714 with the operating system 706. When in commanding mode using application-B 702 the application-specific commands and indicia 714 may be presented to provide keyboard configuration-B 720. In this manner, keyboard layouts can be dynamically changed based on the particular application, whereby applications having their own shortcut key combinations can be implemented.

Figure 8:
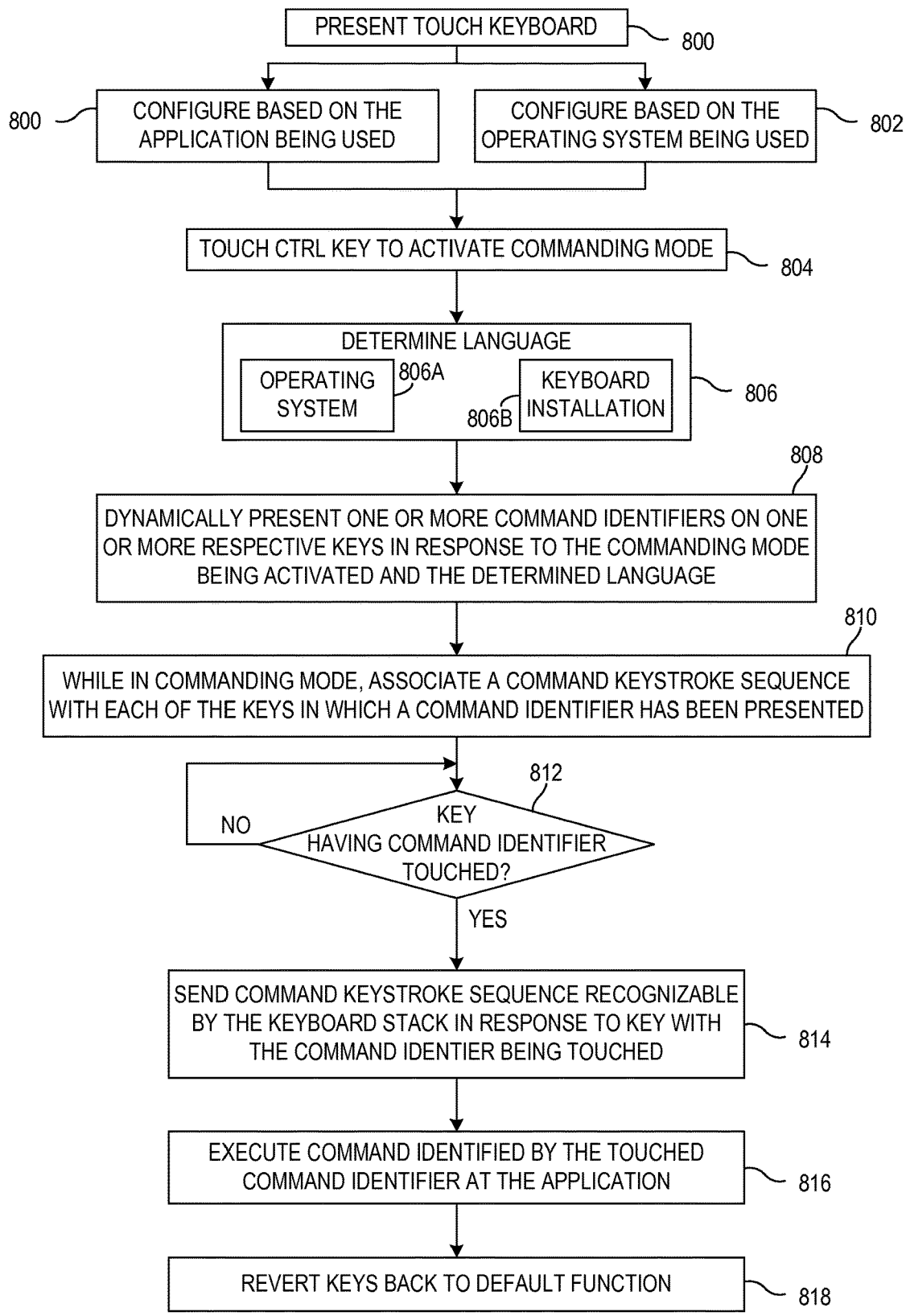
FIG. 8 is a flow diagram illustrating alternative method features in connection with the command assignment and descriptions.

FIG. 8 is a flow diagram illustrating a representative method for facilitating command presentation and execution that identifies various possible features. A touch keyboard or other virtual keyboard is presented as noted at block 800. As previously noted, the dynamic command presentation and implementation may be configured on an application basis as depicted at block 801, or may be configured based on the operating system being used as depicted at block 802. In the application-based embodiment, each application can provide application-specific commands and command identifiers that can be presented when in commanding mode. In the operating system-based embodiment, the operating system can provide system-level commands and command identifiers that can be used for multiple applications running on the operating system.

In the illustrated embodiment, the CTRL key is touched to activate a commanding mode as shown at block 804, although any key(s) may be selected to do so in other embodiments. Block 806 shows that a relevant language may be determined, such as the language of the operating system 806A or the language of the keyboard installation 806B. The determined language may control or at least influence one or more of the command descriptions used, the keys on which commands will be presented, etc.

Based on the commanding mode being activated and the language, one or more command identifiers are dynamically presented on one or more respective keys, as shown at block 808. For example, the command identifier may be a textual description, icon or image that reveals or suggests the command, etc. Block 810 indicates that in addition to presenting a command identifier, a command keystroke sequence is associated with each of the keys in which a command identifier has been presented. For example, a "C" key may become associated with a CTRL+C keystroke sequence when the "C" key is touched when in commanding mode. When a key associated with a dynamically presented command identifier is touched (or otherwise selected) as determined at decision block 812, the command keystroke sequence that is recognizable by the existing keyboard stack is sent as shown at block 814. This embodiment assumes that an existing keyboard stack, such as a keyboard stack used in connection with a physical keyboard, is exploited without having to create a different keyboard stack. In such a case, the command keystroke sequence is provided to mimic that which would be provided by a physical keyboard to produce the same command for that application.

The command identified by the touched command identifier may then be executed at the application as shown at block 816. In one embodiment, the keys may revert back to their default state as shown at block 818. For example, a key that had been dynamically modified to send a "copy" command may revert to a "C" character key in response to a command being sent, in response to the modifier key being toggle off or released, etc.

It should be recognized that the sequence of various functions in flow or block diagrams need not be in the representative order that is depicted unless otherwise noted. For example, in FIG. 3, the order of blocks 302 and 304 does not suggest that these features be performed in this order. Similarly, numerous functions associated with the flow diagram of FIG. 8 need not be performed in the order depicted, and such depictions are merely for purposes of illustration.

Figure 9:
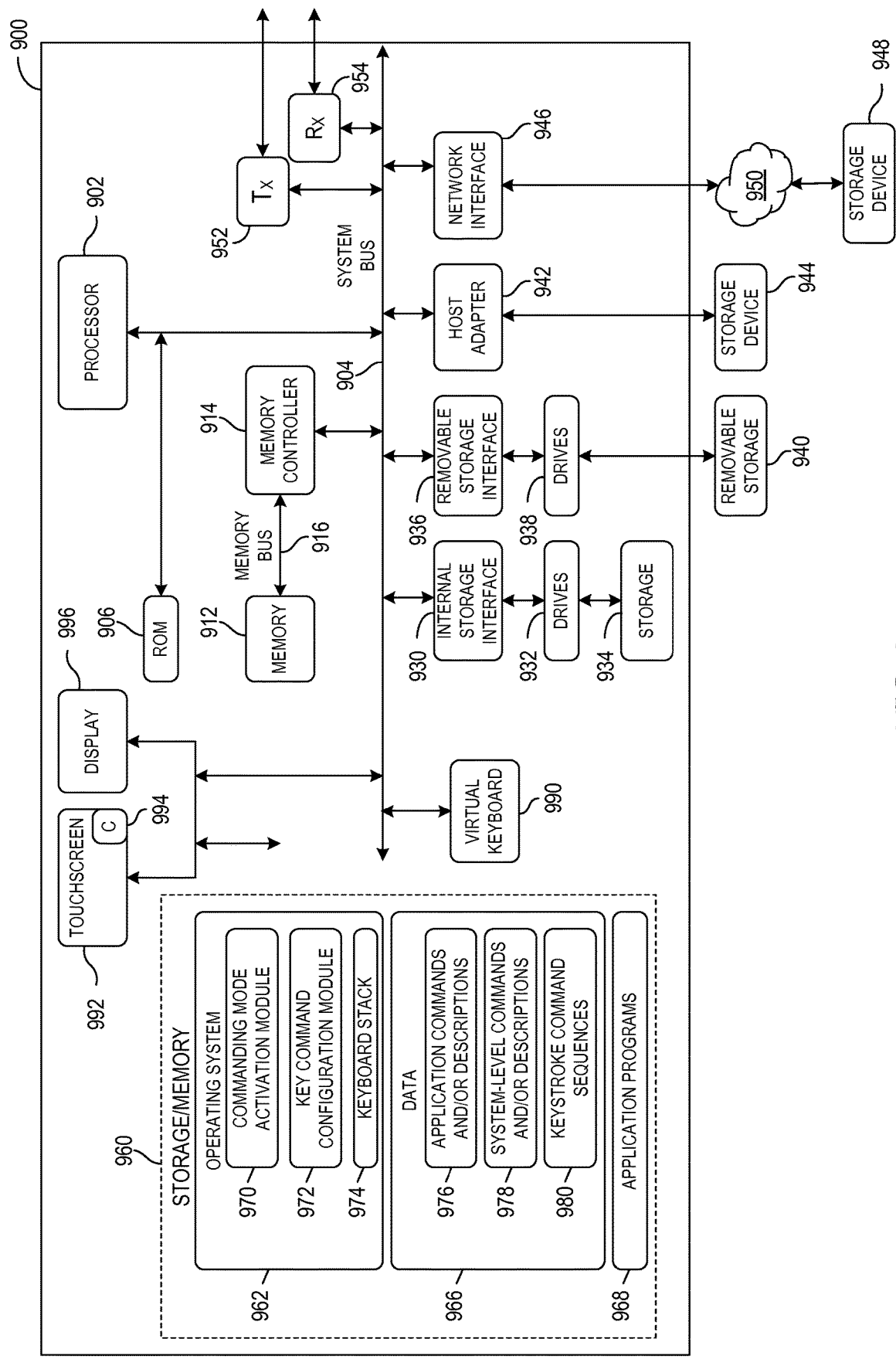
FIG. 9 depicts a representative computing system in which the principles described herein may be implemented.

FIG. 9 depicts a representative computing device or apparatus 900 in which the principles described herein may be implemented. The representative computing device 900 can represent any computing device in which a virtual keyboard or other keyboard where dynamic command assignment and presentation can be effected. The computing environment described in connection with FIG. 9 is described for purposes of example, as the structural and operational disclosure for facilitating dynamic command assignment and presentation is applicable in any environment in which a keyboard may be used for user input. It should also be noted that the computing arrangement of FIG. 9 may, in some embodiments, be distributed across multiple devices (e.g. system processor and display or touchscreen controller, etc.).

The representative computing device 900 may include a processor 902 coupled to numerous modules via a system bus 904. The depicted system bus 904 represents any type of bus structure(s) that may be directly or indirectly coupled to the various components and modules of the computing environment. A read only memory (ROM) 906 may be provided to store firmware used by the processor 902. The ROM 906 represents any type of read-only memory, such as programmable ROM (PROM), erasable PROM (EPROM), or the like.

The host or system bus 904 may be coupled to a memory controller 914, which in turn is coupled to the memory 912 via a memory bus 916. The command assignment and presentation embodiments described herein may involve software that stored in any storage, including volatile storage such as memory 912, as well as non-volatile storage devices. FIG. 9 illustrates various other representative storage devices in which applications, modules, data and other information may be temporarily or permanently stored. For example, the system bus 904 may be coupled to an internal storage interface 930, which can be coupled to a drive(s) 932 such as a hard drive. Storage 934 is associated with or otherwise operable with the drives. Examples of such storage include hard disks and other magnetic or optical media, flash memory and other solid-state devices, etc. The internal storage interface 930 may utilize any type of volatile or non-volatile storage.

Similarly, an interface 936 for removable media may also be coupled to the bus 904. Drives 938 may be coupled to the removable storage interface 936 to accept and act on removable storage 940 such as, for example, floppy disks, optical disks, memory cards, flash memory, external hard disks, etc. In some cases, a host adaptor 942 may be provided to access external storage 944. For example, the host adaptor 942 may interface with external storage devices via small computer system interface (SCSI), Fibre Channel, serial advanced technology attachment (SATA) or eSATA, and/or other analogous interfaces capable of connecting to external storage 944. By way of a network interface 946, still other remote storage may be accessible to the computing device 900. For example, wired and wireless transceivers associated with the network interface 946 enable communications with storage devices 948 through one or more networks 950. Storage devices 948 may represent discrete storage devices, or storage associated with another computing system, server, etc. Communications with remote storage devices and systems may be accomplished via wired local area networks (LANs), wireless LANs, and/or larger networks including global area networks (GANs) such as the Internet.

The computing device 900 may transmit and/or receive information from external sources, such as to obtain keyboard configurations, dynamic command key assignments and command identifiers based on language, etc. Communications between the device 900 and other devices can be effected by direct wiring, peer-to-peer networks, local infrastructure-based networks (e.g., wired and/or wireless local area networks), off-site networks such as metropolitan area networks and other wide area networks, global area networks, etc. A transmitter 952 and receiver 954 are shown in FIG. 9 to depict a representative computing device's structural ability to transmit and/or receive data in any of these or other communication methodologies. The transmitter 952 and/or receiver 954 devices may be stand-alone components, may be integrated as a transceiver(s), may be integrated into or already-existing part of other communication devices such as the network interface 946, etc.

The memory 912 and/or storage 934, 940, 944, 948 may be used to store programs and data used in connection with the dynamic command assignment and presentation techniques described herein. The storage/memory 960 represents what may be stored in memory 912, storage 934, 940, 944, 948, and/or other data retention devices. The representative device's storage/memory 960 may include an operating system 962. Associated with the operating system 962, or separate therefrom, software modules may be provided for performing functions associated with the description herein. For example, a commanding mode activation module 970 and key command configuration module 972 as described in connection with FIG. 1 may be provided integrally or separately from the operating system 962. A keyboard stack 974 or other keyboard handling program as previously described may also be provided.

The device storage/memory 960 may also include data 966, and other programs such as the application programs 968 that receive the user input via the keyboard. Such data includes commands and command descriptions. For example, where the application(s) 968 provide application-specific commands and descriptions, such data may be stored as shown at block 976. System-level commands and/or descriptions 978 may alternatively or additionally be stored for commands and descriptions that can be applied to multiple applications 968, such as those applications conforming to common operating system 962 commands. Keystroke command sequences 980 to be assigned to shortcut keys when in commanding mode may also be stored. These modules and data are depicted for purposes of illustration, and is not intended to represent an exhaustive list. Any programs or data described or utilized in connection with the description provided herein may be associated with the storage/memory 960.

The computing device 900 includes some visual mechanism to present the virtual keyboard(s) 990 described herein. A particular example of a virtual keyboard is a touchscreen 992, which may utilize the processor 902 and/or include its own processor or controller C 994. Other displays 996 may be used as a virtual keyboard 990, such as a projected keyboard.

As previously noted, the representative computing device 900 in FIG. 9 is provided for purposes of example, as any computing device having processing capabilities can carry out the functions described herein using the teachings described herein.

As demonstrated in the foregoing examples, embodiments described herein facilitate dynamic command assignment and command identification on a keyboard when a commanding mode has been initiated. In various embodiments, methods are described that can be executed on a computing device(s), such as by providing software modules that are executable via a processor (which includes one or more physical processors and/or logical processors, controllers, etc.). The methods may also be stored on computer-readable media that can be accessed and read by the processor and/or circuitry that prepares the information for processing via the processor. For example, the computer-readable media may include any digital storage technology, including memory 912, storage 934, 940, 944, 948 and/or any other volatile or non-volatile storage, etc.

Any resulting program(s) implementing features described herein may include computer-readable program code embodied within one or more computer-usable media, thereby resulting in computer-readable media enabling storage of executable functions described herein to be performed. As such, terms such as "computer-readable medium," "computer program product," computer-readable storage, computer-readable media or analogous terminology as used herein are intended to encompass a computer program(s) existent temporarily or permanently on any computer-usable medium.

Having instructions stored on computer-readable media as described herein is distinguishable from instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A computer-implemented method, performed by a computing device comprising a touch-sensitive display, the method comprising:

executing an operating system, the operating system providing select, cut, copy, and paste operations invocable by arbitrary applications being executed by the operating system;

providing a virtual keyboard invocable from the arbitrary applications to be displayed on the touch-sensitive display, the virtual keyboard selectively comprising either a first graphical layout or a second graphical layout, the first graphical layout comprising at least a portion of character keys of the second graphical layout and a plurality of operation keys for two or more of the respective cut, copy, and paste operations, the second graphical layout comprising a plurality of character keys, but not comprising the operation keys of the first graphical layout, both the operation keys and the character keys being selectable keys;

based on detecting an invocation of the select operation while the second graphical layout is displayed, entering a commanding mode by transitioning from displaying the second graphical layout to displaying the first graphical layout, wherein the detected select operation is interactively invoked via a selection of text without use of the virtual keyboard; and based on detecting activation of one of the operation keys by the user while in the commanding mode, executing a corresponding one of the cut, copy, and paste operations that corresponds to the activated operation key, and exiting the commanding mode, wherein exiting the commanding mode includes transitioning from displaying the first graphical layout to displaying the second graphical layout.

2. A computer-implemented method according to claim 1, wherein the select operation is invocable without use of the virtual keyboard.

3. A computer-implemented method according to claim 1, wherein the select operation is invoked by a touch input directed to text displayed by one of the applications.

4. A computer-implemented method according to claim 1, wherein the transitioning from the second graphical layout to the first graphical layout comprises changing the appearance of an operation key in the second graphical layout.

5. A computing device comprising:
a touch-sensitive display;
processing hardware;
storage hardware storing instructions configured to cause the processing hardware to perform a process comprising:
providing operations comprising select, cut, copy, and paste operations to be invocable by applications on the computing device without requiring use of a virtual keyboard;
executing the virtual keyboard, the virtual keyboard comprising alternatively displayable graphic key layouts including a first graphic key layout and a second graphic key layout, the first graphic key layout comprising graphics of selectable keys, the second graphic key layout including graphics of selectable character keys, the first graphic key layout comprising at least some of the graphics of the selectable character keys, the first graphic key layout further comprising graphics of two or more selectable operation keys configured to respectively invoke two or more of the cut, copy, and paste operations, the second graphic key layout not comprising the graphics of the two or more operation keys;
in correspondence with a performance of the select operation while the second graphic key layout is displayed, alternating from displaying the second graphic key layout to displaying the first graphic key layout, wherein the performed select operation is interactively invoked via a selection of text without use of the virtual keyboard; and
in correspondence with activation of one of the operation keys while the first graphic key layout is displayed, executing a corresponding one of the cut, copy, and paste operations that corresponds to the activated operation key, and alternating from displaying the first graphic key layout to displaying the second graphic key layout.

6. A computing device according to claim 5, wherein the virtual keyboard is displayable by the applications, and wherein the copy and paste operations enable exchange of text between the applications without the virtual keyboard.

7. A computing device according to claim 5, wherein, in further correspondence with the performance of the selection operation, entering a commanding mode, and in further correspondence with the activation of one of the operation keys, exiting the commanding mode.

8. A computing device according to claim 5, wherein the graphics of the two or more operation keys indicate the respective cut, copy, and/or past operations represented thereby.

9. A computing device according to claim 5, wherein the instructions comprise an operating system that provides the select, cut, copy, and paste operations.

10. A computing device according to claim 5, wherein the select operation selects displayed text, and wherein the displayed text is selected by touch input directed to the displayed text.

11. A computing device according to claim 5, wherein the operation keys are configured to trigger the two or more of the respective cut, copy, and paste operations responsive to touches of the operation keys.

12. Computer readable storage hardware storing information configured to cause a computing device to perform a process, the process comprising:
executing an operating system comprising select, cut, copy, and paste functions invocable by arbitrary applications on the computing device that are executed by the operating system;
providing a virtual keyboard invocable from the arbitrary applications and configured to be displayed on a touch-sensitive display of the computing device, the virtual keyboard selectively comprising either a first graphical layout for a first mode or a second graphical layout for a second mode, the virtual keyboard configured to alternate between the first mode and the second mode, wherein in the first mode the first graphical layout is displayed and in the second mode the second graphical layout is displayed, the first graphical layout comprising at least a portion of characters keys of the second graphical layout, the first graphical layout further comprising copy-and-paste keys for two or more of the respective cut, copy, and paste functions, the second graphical layout comprising a plurality of character keys but not the copy-and-paste keys of the first graphical layout, both the copy-and-paste keys and the character keys being selectable keys;
responsive to detecting an invocation of the select operation to select text while the virtual keyboard is in the second mode and the second graphical layout is displayed, entering the first mode and exiting the second mode by transitioning from displaying the second graphical layout to displaying the first graphical layout, wherein the select operation is invoked responsive a user input directed to the text without use of the virtual keyboard to select the text;
responsive to detecting an activation of one of the copy-and-paste keys while in the first mode and the first graphical layout is displayed, executing a corresponding one of the cut, copy, and paste functions that corresponds to the activated copy-and-paste key, and switching from the first mode to the second mode by transitioning from displaying the first graphical layout to displaying the second graphical layout.

13. Computer storage hardware according to claim 12, wherein the transitioning from displaying the second graphical layout to displaying the first graphical layout further comprises changing an appearance of a key in the first graphical layout to identify one of the cut, copy, and paste functions.

14. Computer storage hardware according to claim 13, wherein transitioning from displaying the first graphical layout to displaying the second graphical layout further comprises changing the appearance of a key in the second graphical layout.

15. Computer storage hardware according to claim 12, wherein the activation of the one of the operation keys consists of a touch of a single key of the virtual keyboard.

16. Computer storage hardware according to claim 12, wherein the select function is invocable by the arbitrary applications without use of the virtual keyboard.

* * * * *